United States Patent
Ono et al.

(10) Patent No.: US 6,919,060 B2
(45) Date of Patent: Jul. 19, 2005

(54) PROCESS FOR PRODUCING PARTICLES OF A METAL COMPOUND

(75) Inventors: Keiji Ono, Tsukuba (JP); Susumu Miyazaki, Kitasoma-gun (JP); Takayoshi Ezuhara, Tsukuba (JP); Yoshihiro Nishisu, Tsukuba (JP); Mikio Kobayashi, Tsukuba (JP)

(73) Assignees: Sumitomo Chemical Company, Limited, Osaka (JP); National Institute of Advance Industrial Science and Technology, Tokyo (JP)

( * ) Notice: Subject to any disclaimer, the term of this patent is extended or adjusted under 35 U.S.C. 154(b) by 54 days.

(21) Appl. No.: 10/369,599

(22) Filed: Feb. 21, 2003

(65) Prior Publication Data

US 2003/0160214 A1 Aug. 28, 2003

(30) Foreign Application Priority Data

Feb. 26, 2002 (JP) .................................. 2002-049322

(51) Int. Cl.$^7$ .................. C01B 13/36; C01F 17/00; C09K 11/78
(52) U.S. Cl. ................. 423/263; 252/301.4 R; 252/301.4 P; 252/301.4 F; 252/301.4 H; 252/301.4 S; 252/301.5; 252/301.6 R; 252/301.6 S; 252/301.6 F; 252/301.6 P; 423/592.1; 423/593.1
(58) Field of Search .................. 252/301.4 R, 301.4 F, 252/301.6 R, 301.6 F, 301.5; 423/263, 545, 546–610, 617–619, 622, 624, 625, 632–643, 592.1, 593.1, 594

(56) References Cited

U.S. PATENT DOCUMENTS

| | | |
|---|---|---|
| 3,679,398 A | 7/1972 | Geus |
| 4,191,662 A | 3/1980 | Mathers et al. |
| 4,940,918 A | 7/1990 | Rutfield |
| 5,015,452 A | 5/1991 | Matijevic |
| 5,413,736 A | 5/1995 | Nishisu et al. |
| 6,506,320 B2 | 1/2003 | Kobayashi et al. |
| 2002/0017635 A1 * | 2/2002 | Wataya et al. ........ 252/301.4 R |

FOREIGN PATENT DOCUMENTS

| | | |
|---|---|---|
| EP | 0 842 899 A1 | 5/1998 |
| JP | 5-254830 A | 10/1993 |
| JP | 6-271316 A | 9/1994 |
| JP | 11-35320 A | 2/1999 |
| JP | 11-79742 A | 3/1999 |
| WO | WO 96/01297 A1 | 1/1996 |

OTHER PUBLICATIONS

Translation for JP 11–79742, Mar. 23, 1999.*

Patent Abstracts of Japan, vol. 013, No. 302, Jul. 12, 1989 (corresponds to JPA 10–93404, published Apr. 12, 1989).

* cited by examiner

Primary Examiner—Carol M Koslow
(74) Attorney, Agent, or Firm—Sughrue Mion, PLLC

(57) ABSTRACT

The object of the present invention is to provide a process for producing particles of a metal compound having a spherical particle shape and an average particle diameter larger than 0.3 $\mu$m without employing high-pressure conditions. This object is achieved by a process for producing particle of a metal compound comprising a step of adjusting pH of an aqueous solution containing urea and at least one metal element to from 4 to 8, a step of heating the aqueous solution under normal pressure, a step of separating a solid from the solution, and a step of drying the solid.

13 Claims, No Drawings

PROCESS FOR PRODUCING PARTICLES OF A METAL COMPOUND

FIELD OF THE INVENTION

The present invention relates to a process for producing particles of a metal compound. Particularly, the present invention relates to a process for producing a phosphor containing yttrium and europium.

BACKGROUND OF THE INVENTION

Particles of metal compounds have been widely used as functional materials and mainly as functional material for electronics. Particularly, they have been used as phosphor employed for displays such as plasma displays. In order to make their function more effective, for example, in order to make phosphor exhibit high brightness, it is required that particles of phosphor have an almost spherical particle shape and a uniform particle diameter.

JP-A-5-254830, for example, discloses a process for producing spherical fine particles of yttrium oxide having a particle diameter of 0.01 $\mu$m to 3 $\mu$m by subjecting an aqueous solution of yttrium nitrate and urea to hydrothermal treatment at 135° C. under a pressure of 2 kg/cm$^2$, and subjecting the obtained particles to calcination at 850° C. This process, however, is disadvantageous in high cost for industrial practice because it uses a pressure vessel. Therefore, a process without employing high-pressure conditions is desired.

In addition, JP-A-6-271316 discloses a process for producing particles of phosphor comprising a yttrium oxide-europium oxide complex having an average particle diameter of about 0.140 $\mu$m by heating an aqueous solution of yttrium chloride, europium chloride and urea after adjusting its pH to 2.5, preparing particles of a compound containing both of yttrium and europium, and subjecting them to calcination at 850° C. The particles obtained by this process, however, has a small particle diameter and an insufficient brightness as a phosphor. Therefore, a process producing particles of a metal compound having a particle diameter larger than 0.3 $\mu$m is desired so that a phosphor having a higher brightness is obtained.

The object of the present invention is to provide a process for producing particles of a metal compound having a spherical particle shape and an average particle diameter larger than 0.3 $\mu$m without employing high-pressure conditions.

SUMMARY OF THE INVENTION

The present inventors have conducted extensive studies on a process for producing particles of a metal compound by heating an aqueous solution containing metal element and urea, then separating a solid from the solution and drying the solid. As the result, they have found the fact that, when pH of an aqueous solution before heating is adjusted to 4 or more and 8 or less, particles of a metal compound having a spherical particle shape and an average particle diameter larger than 0.3 $\mu$m can be obtained without employing high-pressure conditions, and the fact that, particularly when the obtained particle is applied to a phosphor, a high brightness can be obtained. The present invention has been completed on the basis of such facts.

Consequently, the present invention provides a process for producing particle of a metal compound comprising a step of adjusting pH of an aqueous solution containing urea and at least one metal element to from 4 to 8, a step of heating the aqueous solution under normal pressure, a step of separating a solid from the solution, and a step of drying the solid. Further, the present invention provides the above-described process wherein the temperature of the aqueous solution is raised at a rate of from 0.2° C./minute to 1.5° C./minute during the step of heating. Furthermore, the present invention provides the above-described process wherein preferable pH of the aqueous solution is from 4.5 to 6.5. Additionally, the present invention provides the above-described process wherein a finally attained temperature of the aqueous solution is between 90° C. and its boiling point during the step of heating. Still, the present invention provides the above-described processes wherein the metal elements are yttrium and europium. The present invention also provides a process for producing a particle of metal oxide comprising the particle of a metal compound produced by the above-described processes is calcined at the temperature of from about 800° C. to about 1,500° C. Finally, the present invention provides a process for producing a phosphor comprising yttrium and europium.

DETAILED DISCRIPTION OF THE INVENTION

According to the present invention, pH of an aqueous solution containing urea and at least one metal element is adjusted to from 4 to 8. When pH is less than 4, the average particle diameter of the particles of the metal compound obtained by the process sometimes becomes less than 0.3 $\mu$m, and when pH exceeds 8, precipitates are formed before the step of heating and the obtained particle shape is not sometimes spherical. Preferred pH range is from 4.5 to 6.5.

The method of adjusting pH is not restricted and may include the method of adding an inorganic acid such as hydrochloric acid, nitric acid and phosphoric acid, or organic acid such as formic acid and acetic acid to the aqueous solution if the pH is lower than above range. If the pH is higher than above range, the method may include the method of adding an inorganic base such as alkali metal hydroxide, which may include potassium hydroxide and sodium hydroxide, and aqueous ammonia, or organic base such as triethylamine and pyridine.

The other method of adjusting pH may include the method of controlling molar concentrations of the metal ions and molar concentration of urea contained in the aqueous solution as described later.

After the step of adjusting pH, the aqueous solution is heated under normal pressure. The normal pressure of the present invention means a pressure in a range at which the heating can be carried out without using a pressure vessel, and usually means 0.8 to 1.2 atmosphere (0.08 to 0.12 MPa). When the pressure is higher than or less than the normal pressure, a pressure vessel is required for the step of heating said aqueous solution and the industrial production becomes costly.

The metal element used for the present invention may be anyone that is capable to form precipitates during the step of heating. Such element may include one or more selected from the Group 1B elements such as Cu, Ag, Au; Group 2 metals such as Mg, Ca, Sr, Ba, Zn, Cd, Hg; Group 3 metals such as Al, Ga, In, Tl, Sc, Y; Group 4 metals such as Si, Ge, Sn, Pb, Ti, Zr, Hf; Group 5 metals such as Sb, Bi, V, Nb, Ta; Group 7A metals such as Mn, Tc, Re; Group 8 metals such as Fe, Co, Ni, Ru, Rh, Pd, Os, Ir, Pt; Lanthanide series metals such as La, Ce, Pr, Nd, Pm, Sm, Eu, Gd, Tb, Dy, Ho, Er, Tm, Yb and Lu; and Actinide series metals such as Ac, Th, Pa, U, Np, Pu, Am. Yttrium and europium are preferable for producing phosphors as described later.

Said aqueous solution containing urea and at least one metal element can be obtained by dissolving (a) water-soluble salt(s) of said metal element(s) and urea in water. In this case, a combination of metal elements in the aqueous solution may be selected according to the desired composition of the metal compound to be obtained. And two or more kinds of water-soluble salts of one kind of metal element may be used.

At the step of heating of the present invention, it is preferred that the temperature of the aqueous solution is raised at a rate of from 0.2° C./minute to 1.5° C./minute. When the aqueous solution is heated at a rate of lower than 0.2° C./minute, there may be a possibility that smaller sized particles of about 0.1 μm may be formed, and when the aqueous solution is heated at a rate of higher than 1.5° C./minute, the particle diameter may become sometimes less than 0.3 μm.

It is also preferred that a finally attained temperature of the aqueous solution is between 90° C. and its boiling point during the step of heating. When the attained temperature is lower than 90° C., precipitation is sometimes insufficient.

When the aqueous solution contains two or more kind of metal elements, it is further preferred that the total molar concentration of metal elements in said aqueous solution is from 0.015 mole/liter to 0.045 mole/liter. When the total molar concentration of metal ions is lower than 0.015 mole/liter, the productivity may not be sufficient, and when the concentration exceeding 0.045 mole/liter, aggregation force between primary particles may become stronger.

It is also preferred that the molar concentration of urea in said aqueous solution is from 0.15 mole/liter to 0.55 mole/liter. When the molar concentration of urea is less than 0.15 mole/liter, the precipitation sometimes may not be sufficient, and when the concentration exceeds 0.55 mole/liter, pH sometimes becomes too high.

According to the process described above, spherical particle of the metal compound such as metal hydroxide having an average particle diameter of from 0.4 μm to 0.9 μm determined by a photograph of electron microscope is obtained.

Particle of the metal compound obtained by the above-described process are converted to particle of metal oxide by calcination, if necessary. The temperature for the calcination is preferably between about 800° C. and about 1,500° C. When the temperature is lower than about 800° C., the oxide compound may not be formed, and when the temperature exceeds about 1,500° C., aggregation force between primary particles sometimes may become stronger.

The calcination is conducted usually under air or inert gas such as nitrogen gas, argon gas and the like. The calcination may be preferably conducted under the reductive atmosphere such as hydrogen gas.

In addition, the particles of the metal oxide obtained by the above process are spherical particles of the metal oxide having an average particle diameter of from 0.3 μm to 0.8 μm measured by a photograph of electron microscope.

The process according to the present invention is described in more detail referring to phosphors containing yttrium and europium as examples.

The aqueous solution containing metal elements and urea used in this case is an aqueous solution containing yttrium, europium and urea. The metal compound used for providing yttrium include yttrium chloride ($YCl_3$), yttrium nitrate ($Y(NO_3)_3$) or hydrates thereof. The metal compound used for providing europium includes europium chloride ($EuCl_3$), europium nitrate ($Eu(NO_3)_3$) or hydrates thereof. The above metal compound each containing yttrium and europium, and urea is dissolved into water such as pure water to produce the aqueous solution containing yttrium ion, europium ion and urea. Alternatively, the metal oxides such as $Y_2O_3$, $Eu_2O_3$ and the like is dissolved by hydrochloric acid or nitric acid to provide the aqueous solution containing yttrium ion and europium ion, urea is added to the obtained solution to produce the aqueous solution containing yttrium ion, europium ion and urea. When the aqueous solution containing yttrium ion, europium ion and urea is prepared, it is preferred that pH of the aqueous solution is from 4.5 to 6.5. The method of adjusting pH to this range may include the same methods as described above.

From the viewpoint of suppressing the aggregation of primary particles, it is further preferred that the total molar concentration of yttrium and europium is from 0.015 mole/liter to 0.045 mole/liter. The molar ratio of yttrium to europium (Y/Eu) is not particularly limited and preferably is 99/1 to 80/20. From the viewpoint of adjusting pH of the aqueous solution, the preferable molar concentration of urea in the aqueous solution is from 0.15 mole/liter to 0.55 mole/liter.

Next, the aqueous solution prepared in the above-described manner is placed in a reaction vessel and heated. The heating is carried out under the normal pressure. It is preferred that the temperature of the aqueous solution is raised at a rate of between 0.2° C./minute and 1.5° C./minute. The reaction vessel may include a heatable stirring jar or a heatable tube-type reaction vessel. When a stirring jar is used, conditions for stirring are not particularly limited. It is preferred that the finally attained temperature of the aqueous solution during raising temperature is 90° C. or higher. In addition, the period of keeping the temperature after attaining the finally attained temperature is preferably an hour or more and more preferably 2 hours or more. Lowering rate of the temperature after keeping the temperature is not particularly limited. The temperature may be rapidly lowered at a rate of 5° C./minute or lower, or may be lowered at a rate of between about 1° C./minute and about 0.1° C./minute.

The particles of yttrium-europium hydroxide thus obtained are usually separated by a method such as filtration, centrifugation and the like and then dried. The temperature for drying is preferably in a range of between about 20 and about 300° C. and more preferably between about 90 and about 200° C. Methods for direct drying include evaporation and spray-drying in which simultaneous granulation and drying are effected. If necessary, washing with pure water or the like may be conducted after the separation of solid from the liquid.

The above-described particles of yttrium-europium hydroxide have an average particle diameter of from 0.4 μm to 0.9 μm determined by a photograph of electron microscope, have a spherical particle shape and a narrow particle size distribution.

The obtained particles of yttrium-europium hydroxide can be converted to particles of yttrium-europium oxide by calcining in the air within a range of between about 800° C. and about 1,500° C., preferably between about 1,000° C. and about 1,450° C. The particles of yttrium-europium oxide are spherical particles comprising a complex oxide of yttrium oxide ($Y_2O_3$) and europium oxide ($Eu_2O_3$). The particles of yttrium-europium oxide have an average particle diameter of from 0.3 μm to 0.8 μm determined by a photograph of electron microscope, have a spherical particle shape and a narrow particle size distribution. The particles of the yttrium-europium oxide emit red fluorescence by ultraviolet excitation or vacuum ultraviolet excitation. For example, they are useful for three primary colors fluorescent lamp for 254 nm-excitation, vacuum ultraviolet excitation elements for 147 nm-excitation or 172 nm-excitation and the like.

EXAMPLES

The present invention will now be described by reference of Examples, which should not be construed as a limitation upon the scope of the present invention.

Example 1

In a stirring jar was prepared 1,200 liter of an aqueous solution containing 0.019 mole/liter of yttrium ion, 0.001 mole/liter of europium ion and 0.25 mole/liter of urea. At this time, liquid temperature was 30° C. and pH of the aqueous solution was 5.6. Thereafter, the temperature of the aqueous solution was raised up to 92° C. at a rate of 0.7° C./min under 1 atmosphere (0.1 MPa), and was kept at 92° C. for 2 hours, and then cooled to 45° C. at a rate of 0.5° C./min to produce slurry. The obtained slurry had a pH of 7.1. Then solid and liquid phases were separated by filtering the obtained slurry and the solid was washed with water. The obtained solid substance was dried to give particles of yttrium-europium hydroxide. The obtained particles of yttrium-europium hydroxide were photographed under a scanning type electron microscope (SEM) (manufactured by JEOL). It was confirmed that the product was sphere particles having an average particle diameter of 0.7 $\mu$m with almost no aggregation between primary particles.

Example 2

Next, the particles of yttrium-europium hydroxide obtained in Example 1 were calcined in the air at 1,300° C. for 2 hours to give particles of yttrium-europium oxide. The obtained particles were photographed under a scanning type electron microscope (SEM) (manufactured by JEOL). It was confirmed that the product was sphere particles having an average particle diameter of 0.5 $\mu$m. In addition, the particles of yttrium-europium oxide were evaluated with X-rays (CuK $\alpha$ diffraction apparatus (Rotaflex RU-300, manufactured by RIGAKU)). It was confirmed that the product was single-phase having a structure in which europium formed solid-solution onto yttrium oxide. In addition, the particles of yttrium-europium oxide were placed in a vacuum jar, kept in a vacuum less than 6.7 Pa ($5 \times 10^{-2}$ torr) and irradiated by ultraviolet rays with an excimer 146 nm lamp (Model H0012, manufactured by Ushio Electric Inc.). A red light emission was observed and its brightness was 123 when the brightness in Comparative Example 1 was taken as 100. This means that the brightness was very high.

Example 3

Particles of yttrium-europium hydroxide were obtained in the same manner as described in Example 1 except that the amount of the aqueous solution was changed to 1 liter. The obtained particles of yttrium-europium hydroxide were photographed under a scanning type electron microscope (SEM) (manufactured by JEOL). The product was sphere particles having an average particle diameter of 0.7 $\mu$m with almost no aggregation between primary particles.

Example 4

Next, the particles obtained in Example 3 were calcined in the air at 1,300° C. for 2 hours to give particles of yttrium-europium oxide. The obtained particles were photographed under a scanning type electron microscope (SEM) (manufactured by JEOL). It was confirmed that the product was sphere particles having an average particle diameter of 0.5 $\mu$m. In addition, the particles of yttrium-europium oxide were evaluated with X-rays (CuK $\alpha$ diffraction apparatus (Rotaflex RU-300, manufactured by RIGAKU)). It was confirmed that the product was single-phase having a structure in which europium formed solid-solution onto yttrium oxide. Additionally, the particles of yttrium-europium oxide were placed in a vacuum jar, kept in vacuum less than 6.7 Pa ($5 \times 10^{-2}$ torr) and irradiated by ultraviolet rays with an excimer 146 nm lamp (Model H0012, manufactured by Ushio Electric Inc.). A red light emission was observed and its brightness was 125 when the brightness in Comparative Example 1 was taken as 100. This means that the brightness was very high.

Example 5

Particles of yttrium-europium hydroxide were obtained in the same manner as described in Example 3 except that the temperature of the aqueous solution was raised at a rate of 0.3° C./minute. The obtained particles of yttrium-europium hydroxide were photographed under a scanning type electron microscope (SEM) (manufactured by JEOL). The product was sphere particles having an average particle diameter of 0.5 to 0.7 $\mu$m with almost no aggregation between primary particles. Next, the obtained particles of yttrium-europium hydroxide were calcined in the air at 1,300° C. for 2 hours to give particles of yttrium-europium oxide. The obtained particles of yttrium-europium oxide were placed in a vacuum jar, kept in a vacuum less than 6.7 Pa ($5 \times 10^{-2}$ torr) and irradiated by ultraviolet rays with an excimer 146 nm lamp (Model H0012, manufactured by Ushio Electric Inc.). A red light emission was observed and its brightness was 120 when the brightness in Comparative Example 1 was taken as 100. This means that the brightness was high.

Example 6

Particles of yttrium-europium hydroxide were obtained in the same manner as described in Example 3 except that the temperature of the aqueous solution was raised at a rate of 0.15° C./minute. The obtained particles of yttrium-europium hydroxide were photographed under a scanning type electron microscope (SEM) (manufactured by JEOL). The product contained sphere particles having a particle diameter of 0.7 $\mu$m mixed with many particles having a particle diameter of about 0.1 $\mu$m. Next, the obtained particles of yttrium-europium hydroxide were calcined in the air at 1,300° C. for 2 hours to give particles of yttrium-europium oxide. The obtained particles of yttrium-europium oxide were placed in a vacuum jar, kept in a vacuum less than 6.7 Pa ($5 \times 10^{-2}$ torr) and irradiated by ultraviolet rays with an excimer 146 nm lamp (Model H0012, manufactured by Ushio Electric Inc.). A red light emission was observed and its brightness was 115 when the brightness in Comparative Example 1 was taken as 100.

Comparative Example 1

Particles of yttrium-europium hydroxide were obtained in the same manner as described in Example 3 except that pH was adjusted to 2.0 by dropwise adding hydrochloric acid to the aqueous solution before heating. The obtained particles of yttrium-europium hydroxide were photographed under a scanning type electron microscope (SEM) (manufactured by JEOL) The product was sphere particles having an average particle diameter of 0.2 μm with almost no aggregation between primary particles. Next, the obtained particles of yttrium-europium hydroxide were calcined in the air at 1,300° C. for 2 hours to give particles of yttrium-europium oxide. The obtained particles of yttrium-europium oxide were placed in a vacuum jar, kept in a vacuum less than 6.7 Pa ($5 \times 10^{-2}$ torr) and irradiated by ultraviolet rays with an excimer 146 nm lamp (Model H0012, manufactured by Ushio Electric Inc.). A red light emission was observed and its brightness was taken as 100.

Comparative Example 2

Particles of yttrium-europium hydroxide were obtained in the same manner as described in Example 3 except that pH was adjusted to 8.2 by dropwise adding aqueous ammonia to the aqueous solution before heating in Example 3. The solid and liquid phases were separated by centrifuging the obtained slurry and the solid substance was photographed under a scanning type electron microscope (SEM) (manufactured by JEOL). The obtained particles of yttrium-europium hydroxide were strongly aggregated particles.

According to the invention, sphere particles of a metal compound can be produced by simple procedure without employing high-pressure conditions. In addition, since the metal compound provided by the present invention is sphere particle and the phosphor obtained from the metal compound of the present invention has also sphere particle, the phosphor can be easily handled, can be easily coated when dispersed in a solvent to form a coating solution. Further, a phosphor film having a high brightness can be produced by a simple procedure, and has a high brightness. Therefore, the product is suitable for three primary colors fluorescent lamp, plasma display and the like. Consequently, the invention is very useful in the industry.

What is claimed is:

1. A process for producing particle of a metal compound comprising a step of adjusting pH of an aqueous solution containing urea and at least one metal element to from 4 to 8, a step of heating the aqueous solution under normal pressure, a step of separating a solid from the solution, and a step of drying the solid.

2. The process according to claim 1, wherein the pH is from 4.5 to 6.5.

3. The process according to claim 1, wherein the temperature of the aqueous solution is raised at a rate of from 0.2° C./minute to 1.5° C./minute during the step of heating.

4. The process according to claim 1, wherein a finally attained temperature of the aqueous solution is between 90° C. and its boiling point during the step of heating.

5. The process according to claim 1, wherein the aqueous solution contains two or more kinds of metal elements.

6. The process according to claim 5, wherein the total molar concentration of metal element in the aqueous solution is from 0.015 mole/liter to 0.045 mole/liter.

7. The process according to claim 1 or 5, wherein the molar concentration of urea in the aqueous solution is from 0.15 mole/liter to 0.55 mole/liter.

8. The process according to claim 5, wherein the aqueous solution contains yttrium and europium.

9. The process according to claim 1, wherein the particle of a metal compound is the spherical particle and has an average particle diameter of from 0.4 μm to 0.9 μm determined by a photograph of electron microscope.

10. A process for producing a particle of metal oxide comprising a step of adjusting pH of an aqueous solution containing urea and at least one metal element to from 4 to 8, a step of heating the aqueous solution under normal pressure, a step of separating a solid from the solution, a step of drying the solid to obtain particle of a metal compound, and the step of calcining the particle of a metal compound at the temperature of from about 800° C. to about 1,500° C.

11. The process according to claim 10, wherein the particles of the metal oxide are spherical particles and have an average particle diameter of from 0.3 μm to 0.8 μm measured by a photograph of electron microscope.

12. The process according to claim 10, wherein the aqueous solution contains two or more kinds of metal elements.

13. The process according to claim 12, wherein the metal elements are yttrium and europium.

* * * * *